US012648025B2

(12) United States Patent
Cao et al.

(10) Patent No.: US 12,648,025 B2
(45) Date of Patent: Jun. 2, 2026

(54) FLEXIBLE RANDOM ACCESS CHANNEL OCCASION (RO) ASSOCIATION FOR MULTIPLE CARRIER OPERATION

(71) Applicant: QUALCOMM Incorporated, San Diego, CA (US)

(72) Inventors: Yiqing Cao, Beijing (CN); Jing Lei, San Diego, CA (US); Peter Gaal, San Diego, CA (US); Alberto Rico Alvarino, San Diego, CA (US); Kazuki Takeda, Minato-ku (JP); Juan Montojo, San Diego, CA (US); Wanshi Chen, San Diego, CA (US); Bin Han, Beijing (CN); Ting Wang, Beijing (CN); Yan Li, Beijing (CN); Zhimin Du, Beijing (CN); Kefeng Zhang, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 325 days.

(21) Appl. No.: 18/558,343

(22) PCT Filed: Jul. 16, 2021

(86) PCT No.: PCT/CN2021/106706
    § 371 (c)(1),
    (2) Date: Oct. 31, 2023

(87) PCT Pub. No.: WO2023/283920
    PCT Pub. Date: Jan. 19, 2023

(65) Prior Publication Data
    US 2024/0224339 A1    Jul. 4, 2024

(51) Int. Cl.
    *H04W 4/00*        (2018.01)
    *H04W 48/12*       (2009.01)
    *H04W 74/0833*     (2024.01)

(52) U.S. Cl.
    CPC ....... *H04W 74/0833* (2013.01); *H04W 48/12* (2013.01)

(58) Field of Classification Search
    CPC ............. H04W 74/0833; H04W 48/12; H04W 72/1263; H04W 72/0453
    See application file for complete search history.

(56) References Cited

U.S. PATENT DOCUMENTS 8,526,374 B2      9/2013  Damnjanovic et al.
    2010/0035625 A1*  2/2010  Damnjanovic ....... H04W 72/00
                                                    455/450

(Continued)

FOREIGN PATENT DOCUMENTS

CN        109565879 A      4/2019
    WO    WO-2010030935 A2     3/2010
    WO    WO-2021119127        6/2021

OTHER PUBLICATIONS

Supplementary European Search Report—EP21949704—Search Authority—Munich—Feb. 24, 2025.
    (Continued)

*Primary Examiner* — Abdelnabi O Musa
(74) *Attorney, Agent, or Firm* — NORTON ROSE FULBRIGHT US LLP

(57) ABSTRACT

This disclosure provides systems, methods, and devices for wireless communication that support configuring associations between system information of at least one downlink (DL) anchor carrier and at least one random access channel (RACH) occasion (RO) of an uplink (UL) anchor carrier for initial access in flexible multicarrier operations. System information may be transmitted by a base station to a UE over the DL anchor carrier. In aspects, the at least one DL anchor carrier may be mapped to an UL anchor carrier, or to one or more candidate UL anchor carriers from which the UE may configurably select the UL anchor carrier, for initial
    (Continued)

access operations. In aspects, the UL anchor carrier and/or the one or more candidate UL anchor carriers may be respectively associated with one or more ROs. The UE may perform initial access operations over the UL anchor carrier using the associated one or more ROs.

25 Claims, 7 Drawing Sheets

(56)                    References Cited

U.S. PATENT DOCUMENTS

| 2010/0067470 A1* | 3/2010 | Damnjanovic | ....... H04L 5/0053 |
| | | | 370/329 |
| 2010/0130218 A1* | 5/2010 | Zhang | ............... H04W 74/0833 |
| | | | 455/458 |
| 2011/0096735 A1 | 4/2011 | Damnjanovic et al. | |
| 2011/0111788 A1* | 5/2011 | Damnjanovic | ..... H04W 52/343 |
| | | | 455/522 |
| 2015/0296492 A1* | 10/2015 | Bala | ...................... H04L 5/0007 |
| | | | 370/329 |
| 2018/0014322 A1* | 1/2018 | Loehr | ............... H04W 28/0278 |
| 2018/0160407 A1* | 6/2018 | Wang | ..................... H04W 72/23 |
| 2021/0051663 A1* | 2/2021 | Chen | ..................... H04L 5/0094 |
| 2021/0112603 A1* | 4/2021 | Xue | ..................... H04L 5/0053 |

OTHER PUBLICATIONS

International Search Report and Written Opinion—PCT/CN2021/106706—ISA/EPO—Feb. 24, 2022.

* cited by examiner

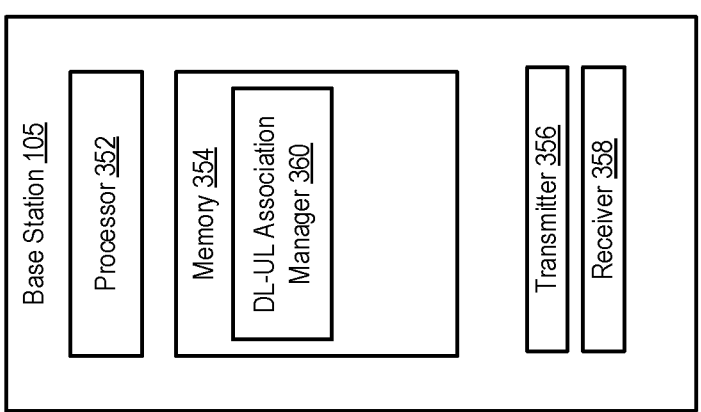
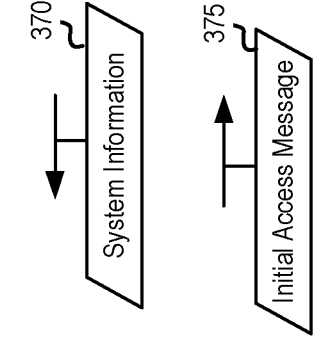
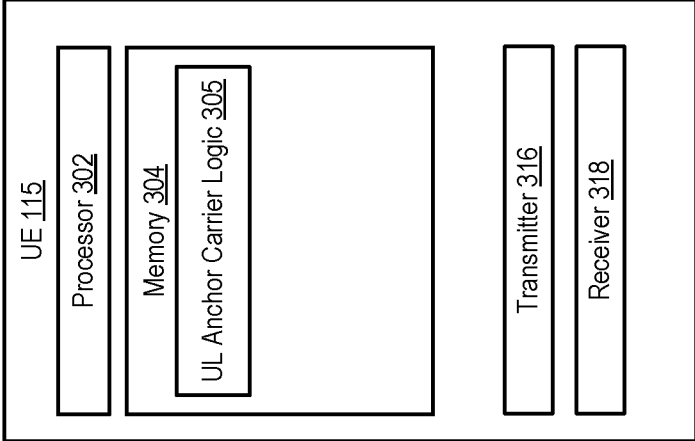
*FIG. 3*

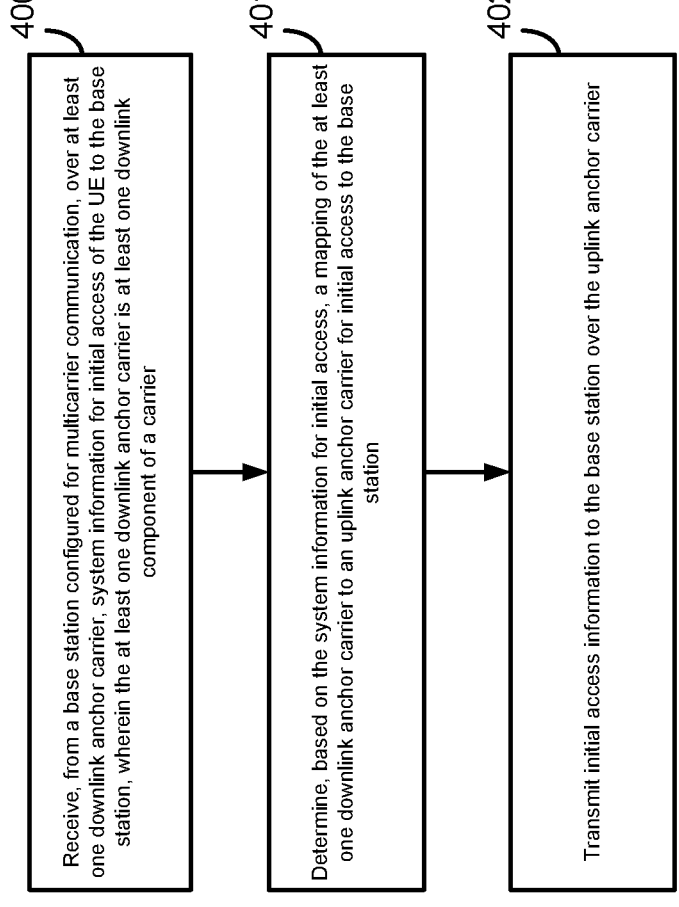

400

Receive, from a base station configured for multicarrier communication, over at least one downlink anchor carrier, system information for initial access of the UE to the base station, wherein the at least one downlink anchor carrier is at least one downlink component of a carrier

401

Determine, based on the system information for initial access, a mapping of the at least one downlink anchor carrier to an uplink anchor carrier for initial access to the base station

402

Transmit initial access information to the base station over the uplink anchor carrier

FIG. 4

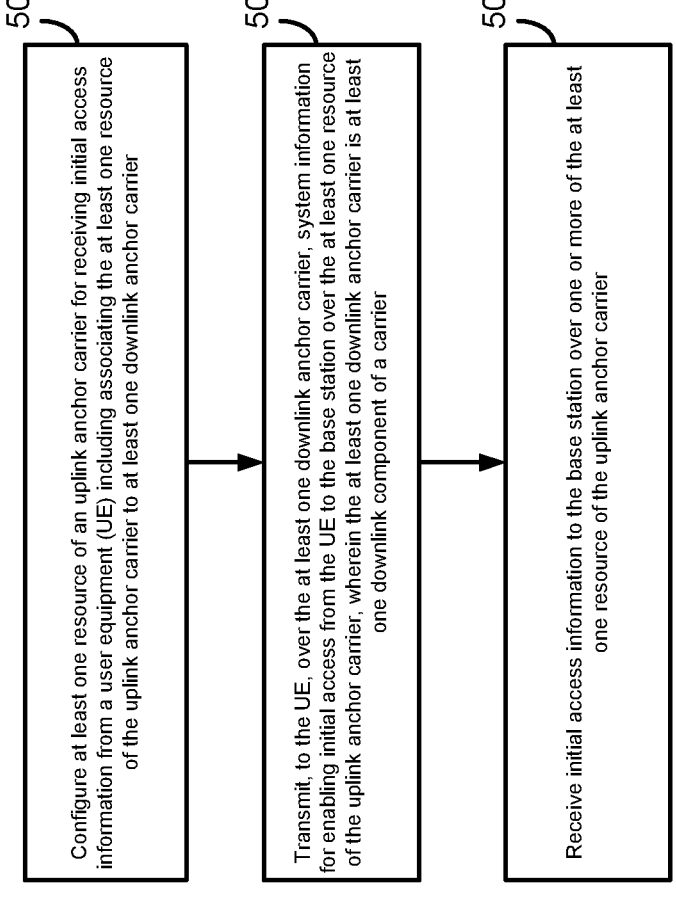

Configure at least one resource of an uplink anchor carrier for receiving initial access information from a user equipment (UE) including associating the at least one resource of the uplink anchor carrier to at least one downlink anchor carrier

500

Transmit, to the UE, over the at least one downlink anchor carrier, system information for enabling initial access from the UE to the base station over the at least one resource of the uplink anchor carrier, wherein the at least one downlink anchor carrier is at least one downlink component of a carrier

501

Receive initial access information to the base station over one or more of the at least one resource of the uplink anchor carrier

FLEXIBLE RANDOM ACCESS CHANNEL OCCASION (RO) ASSOCIATION FOR MULTIPLE CARRIER OPERATION

CROSS-REFERENCE TO RELATED APPLICATIONS

This application claims the benefit of International Patent Application No. PCT/CN2021/106706, entitled "FLEXIBLE RANDOM ACCESS CHANNEL OCCASION (RO) ASSOCIATION FOR MULTIPLE CARRIER OPERATION" and filed on Jul. 16, 2021, which is expressly incorporated by reference herein in its entirety.

TECHNICAL FIELD

Aspects of the present disclosure relate generally to wireless communication systems, and more particularly, to association of random access channel (RACH) occasion (RO) in multiple carrier operations.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication performed by a user equipment (UE) includes receiving, from a base station configured for multicarrier communication, over at least one downlink anchor carrier, system information for initial access of the UE to the base station. In aspects, the at least one downlink anchor carrier is at least one downlink component of a carrier. The method further includes determining, based on the system information for initial access, a mapping of the at least one downlink anchor carrier to an uplink anchor carrier for initial access to the base station, and transmitting initial access information to the base station over the uplink anchor carrier.

In an additional aspect of the disclosure, a method of wireless communication performed by a base station includes configuring at least one resource of an uplink anchor carrier for receiving initial access information from a UE including associating the at least one resource of the uplink anchor carrier to at least one downlink anchor carrier, and transmitting, to the UE, over the at least one downlink anchor carrier, system information for enabling initial access from the UE to the base station over the at least one resource of the uplink anchor carrier. In aspects, the at least one downlink anchor carrier is at least one downlink component of a carrier. The method further includes receiving initial access information over one or more of the at least one resource of the uplink anchor carrier.

In an additional aspect of the disclosure, an apparatus includes at least one processor and a memory coupled to the at least one processor. The memory stores processor-readable code that, when executed by the at least one processor, is configured to receiving, by a UE from a base station configured for multicarrier communication, over at least one downlink anchor carrier, system information for initial access of the UE to the base station. In aspects, the at least one downlink anchor carrier is at least one downlink component of a carrier. The operations further include determining, based on the system information for initial access, a mapping of the at least one downlink anchor carrier to an uplink anchor carrier for initial access to the base station, and transmitting initial access information to the base station over the uplink anchor carrier.

In an additional aspect of the disclosure, an apparatus includes at least one processor and a memory coupled to the at least one processor. The memory stores processor-readable code that, when executed by the at least one processor, is configured to perform operations including configuring, by a base station, at least one resource of an uplink anchor carrier for receiving initial access information from a UE including associating the at least one resource of the uplink anchor carrier to at least one downlink anchor carrier, and transmitting, to the UE, over the at least one downlink anchor carrier, system information for enabling initial access from the UE to the base station over the at least one resource of the uplink anchor carrier. In aspects, the at least one downlink anchor carrier is at least one downlink component of a carrier. The operations further include receiving initial access information over one or more of the at least one resource of the uplink anchor carrier.

In an additional aspect of the disclosure, a non-transitory computer-readable medium stores instructions that, when executed by a processor, cause the processor to perform operations. The operations include receiving, by a UE from a base station configured for multicarrier communication, over at least one downlink anchor carrier, system information for initial access of the UE to the base station. In aspects, the at least one downlink anchor carrier is at least one downlink component of a carrier. The operations further include determining, based on the system information for initial access, a mapping of the at least one downlink anchor carrier to an uplink anchor carrier for initial access to the base station, and transmitting initial access information to the base station over the uplink anchor carrier.

In an additional aspect of the disclosure, a non-transitory computer-readable medium stores instructions that, when executed by a processor, cause the processor to perform operations. The operations include configuring, by a base station, at least one resource of an uplink anchor carrier for receiving initial access information from a UE including associating the at least one resource of the uplink anchor carrier to at least one downlink anchor carrier, and transmitting, to the UE, over the at least one downlink anchor carrier, system information for enabling initial access from the UE to the base station over the at least one resource of the uplink anchor carrier. In aspects, the at least one downlink anchor carrier is at least one downlink component of a carrier. The operations further include receiving initial access information over one or more of the at least one resource of the uplink anchor carrier.

In an additional aspect of the disclosure, an apparatus includes means for receiving, by a UE from a base station configured for multicarrier communication, over at least one downlink anchor carrier, system information for initial access of the UE to the base station. In aspects, the at least one downlink anchor carrier is at least one downlink component of a carrier. The apparatus further includes means for determining, based on the system information for initial access, a mapping of the at least one downlink anchor carrier to an uplink anchor carrier for initial access to the base station, and means for transmitting initial access information to the base station over the uplink anchor carrier.

In an additional aspect of the disclosure, an apparatus includes means for configuring, by a base station, at least one resource of an uplink anchor carrier for receiving initial access information from a UE including associating the at least one resource of the uplink anchor carrier to at least one downlink anchor carrier, and means for transmitting, to the UE, over the at least one downlink anchor carrier, system information for enabling initial access from the UE to the base station over the at least one resource of the uplink anchor carrier. In aspects, the at least one downlink anchor carrier is at least one downlink component of a carrier. The apparatus further includes means for receiving initial access information over one or more of the at least one resource of the uplink anchor carrier.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 3 is a block diagram illustrating an example wireless communication system that supports configuring associations between initial access system information of at least one downlink (DL) anchor carrier and at least one random access channel (RACH) occasion (RO) of an uplink (UL) anchor carrier for initial access in flexible multicarrier operations according to one or more aspects.

FIG. 4 is a flow diagram illustrating an example process that supports configuring associations between initial access system information of at least one DL anchor carrier and at least one RO of an UL anchor carrier for initial access in flexible multicarrier operations according to one or more aspects.

FIG. 5 is a flow diagram illustrating an example process that supports configuring associations between initial access system information of at least one DL anchor carrier and at least one RO of an UL anchor carrier for initial access in flexible multicarrier operations according to one or more aspects.

Like reference numbers and designations in the various drawings indicate like elements.

DETAILED DESCRIPTION

Figure 1:
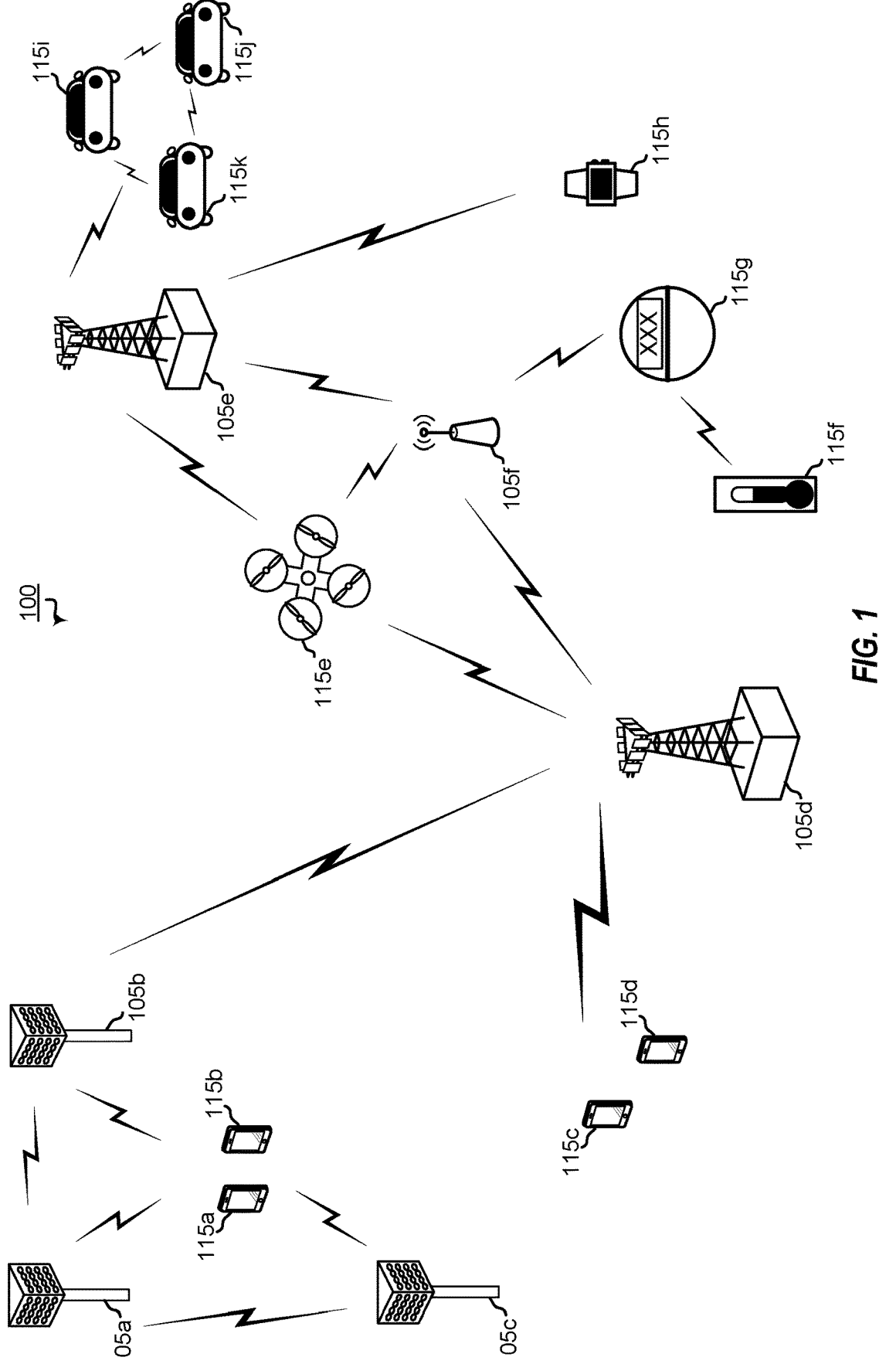
FIG. 1 is a block diagram illustrating example details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks.

In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.99999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to as (inter-changeably) as a "sub-6 GHz" band in various documents and articles. A similar nomenclature issue sometimes occurs with regard to FR2, which is often referred to (interchange-ably) as a "millimeter wave" (mmWave) band in documents and articles, despite being different from the extremely high frequency (EHF) band (30 GHz-300 GHz) which is identified by the International Telecommunications Union (JTU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of sub-carrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, or backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
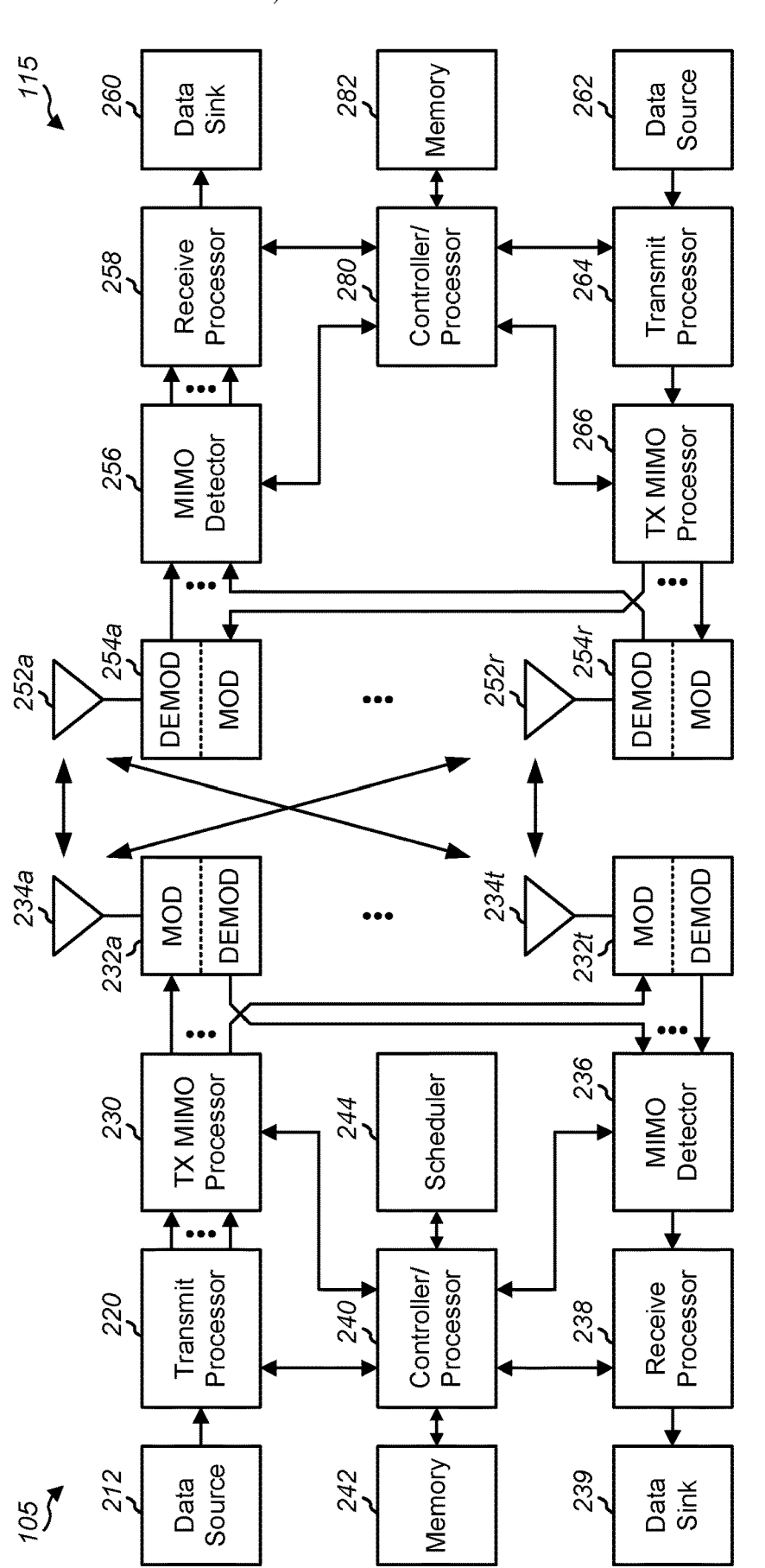
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 4 and 5, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel.

For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

In general, four categories of LBT procedure have been suggested for sensing a shared channel for signals that may indicate the channel is already occupied. In a first category (CAT 1 LBT), no LBT or CCA is applied to detect occupancy of the shared channel. A second category (CAT 2 LBT), which may also be referred to as an abbreviated LBT, a single-shot LBT, a 16-μs, or a 25-μs LBT, provides for the node to perform a CCA to detect energy above a predetermined threshold or detect a message or preamble occupying the shared channel. The CAT 2 LBT performs the CCA without using a random back-off operation, which results in its abbreviated length, relative to the next categories.

A third category (CAT 3 LBT) performs CCA to detect energy or messages on a shared channel, but also uses a random back-off and fixed contention window.

Therefore, when the node initiates the CAT 3 LBT, it performs a first CCA to detect occupancy of the shared channel. If the shared channel is idle for the duration of the first CCA, the node may proceed to transmit. However, if the first CCA detects a signal occupying the shared channel, the node selects a random back-off based on the fixed contention window size and performs an extended CCA. If the shared channel is detected to be idle during the extended CCA and the random number has been decremented to 0, then the node may begin transmission on the shared channel. Otherwise, the node decrements the random number and performs another extended CCA. The node would continue performing extended CCA until the random number reaches 0. If the random number reaches 0 without any of the extended CCAs detecting channel occupancy, the node may then transmit on the shared channel. If at any of the extended CCA, the node detects channel occupancy, the node may re-select a new random back-off based on the fixed contention window size to begin the countdown again.

A fourth category (CAT 4 LBT), which may also be referred to as a full LBT procedure, performs the CCA with energy or message detection using a random back-off and variable contention window size. The sequence of CCA detection proceeds similarly to the process of the CAT 3 LBT, except that the contention window size is variable for the CAT 4 LBT procedure.

Sensing for shared channel access may also be categorized into either full-blown or abbreviated types of LBT procedures. For example, a full LBT procedure, such as a CAT 3 or CAT 4 LBT procedure, including extended channel clearance assessment (ECCA) over a non-trivial number of 9-µs slots, may also be referred to as a "Type 1 LBT." An abbreviated LBT procedure, such as a CAT 2 LBT procedure, which may include a one-shot CCA for 16-µs or 25-µs, may also be referred to as a "Type 2 LBT."

Use of a medium-sensing procedure to contend for access to an unlicensed shared spectrum may result in communication inefficiencies. This may be particularly evident when multiple network operating entities (e.g., network operators) are attempting to access a shared resource. In wireless communications system 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In current wireless communication systems, techniques for enabling initial access by a UE to a base station may include a process that is performed between the UE and the base station, in which system information is received, from a base station, by a UE to perform downlink (DL) synchronization. The system information transmitted to the UE for initial access may include a synchronization signal block (SSB), a control resource set (CORESET), a system information block (SIB) (e.g., SIB1, SIB2, . . . , SIB9, etc.), other system information (OSI), etc. This system information for initial access may provide information to the UE that the UE may use to access or setup communications with the base station. In particular, the information for initial access may include configuration for one or more random access channel (RACH) occasion (RO). The UE may perform initial access operations (e.g., RACH operations) over the configured ROs (e.g., by transmitting RACH transmission using the RO resources), which may enable the UE and the base station to perform system access, uplink (UL) synchronization, and/or the like.

In some implementations, such as in multicarrier operations where multiple carriers may be used for communication between the UE and the base station, the system information for initial access (e.g., the SSB) received over a DL carrier from the base station may be associated with the RO of the UL carrier as per the configuration in the system information. As such, in these cases, there may be a one-to-one association between the DL SSB carrier and the UL RO carrier. For example, in a frequency domain division (FDD) transmission band, there may be a DL frequency (over which the SSB may be received by the UE) that is paired to an UL frequency (over which the resources of the ROs may exist) and in this manner, the DL SSB is always paired to an UL RO. Similarly, in a time domain division (TDD) implementation, the DL SSB transmission may be paired to an RO in a same band and/or same frequency. Thus, for current TDD and FDD, there may be a fixed DL SSB-UL RO association.

In some implementations, there may be cases in which there may be more UL carriers than DL carriers configured. As such, implementing a flexible multiple carrier approach may create problems with the DL SSB-UL RO associations described above, as there may be an asymmetrical ratio of DL to UL carriers (e.g., there may be less DL carriers than UL carriers). Because the current implementation of DL SSB-UL RO association for initial access relies upon the one-to-one correspondence of DL-UL carriers, the fixed DL SSB-UL RO association of current implementations may not be possible.

Various aspects of the present disclosure are directed to systems and methods that support configuring associations between initial access system information of at least one DL anchor carrier and at least one RO of an UL anchor carrier for initial access in flexible multicarrier operations. In particular aspects, at least one DL carrier of a multicarrier configuration may be fixed as a DL anchor carrier. System information (e.g., SSB, CORESET, SIB, etc.) may be transmitted by a base station and received by a UE over the DL anchor carrier. In aspects, the DL anchor carrier may be configured to be mapped to one or more candidate UL anchor carriers, from which a UL anchor carrier may be selected for initial access operations. In aspects, the base station may configure resources for one or more ROs for each of the one or more candidate UL anchor carriers to be used for initial access by the UE, and in this manner may create an association between initial system information (e.g., including SSB) transmitted to the UE over the DL anchor carrier and the one or more ROs of the UL anchor carriers. The UE may determine, based on the initial system information, the mapping between the at least one DL anchor carrier (e.g., carrying the SSB) and the one or more candidate UL anchor carriers (e.g., each candidate associated with one or more ROs) configured for initial access. In some aspects, the system information carried over the at least one DL anchor carrier may explicitly signal the carrier ID or IDs of the candidate UL anchor carriers along with the respective RO configuration for the candidate UL anchor carriers, or may include an implicit mapping between the ROs and UL carrier IDs to which respective ROs belong to. In aspects, the UE may transmit initial access information (e.g., RACH related transmissions) to the base station over the at least one UL anchor carrier.

FIG. 3 is a block diagram of an example wireless communications system 300 that supports configuring associations between initial access system information of at least one DL anchor carrier and at least one RO of an UL anchor carrier for initial access in flexible multicarrier operations in a wireless communication system according to one or more aspects of the present disclosure. In some examples, wireless communications system 300 may implement aspects of wireless network 100. Wireless communications system 300 includes UE 115 and base station 105. Although one UE 115 and one base station 105 are illustrated, in some other implementations, wireless communications system 300 may generally include multiple UEs 115 and may include more than one base station 105.

UE 115 may include a variety of components (such as structural, hardware components) used for carrying out one or more functions described herein. For example, these components may include one or more processors 302 (hereinafter referred to collectively as "processor 302"), one or more memory devices 304 (hereinafter referred to collectively as "memory 304"), one or more transmitters 316 (hereinafter referred to collectively as "transmitter 316"), and one or more receivers 318 (hereinafter referred to collectively as "receiver 318"). Processor 302 may be configured to execute instructions stored in memory 304 to perform the operations described herein. In some implementations, processor 302 includes or corresponds to one or more of receive processor 258, transmit processor 264, and controller 280, and memory 304 includes or corresponds to memory 282.

Memory 304 includes or is configured to store UL anchor carrier logic 305. In aspects, UL anchor carrier logic 305 may be configured to perform operations for determining a UL anchor carrier for performing initial access operations (e.g., RACH operations) with a base station (e.g., base station 105). In aspects, UL anchor carrier logic 305 may determine the UL anchor carrier for performing initial access operations based on system information for initial access received by UE 105 from base station 105 over at least one DL anchor carrier. In aspects, the initial access operations may be performed over resources of one or more RO configured by the system information for initial access received by UE 105 from base station 105 over the at least one DL anchor carrier. The system information for initial access may include configuration of the one or more RO, and may indicate, implicitly or explicitly, a carrier ID of the at least one UL anchor carrier to which the one or more RO belongs.

Transmitter 316 is configured to transmit reference signals, control information and data to one or more other devices, and receiver 318 is configured to receive references signals, synchronization signals, control information and data from one or more other devices. For example, transmitter 316 may transmit signaling, control information and data to, and receiver 318 may receive signaling, control information and data from base station 105. In some implementations, transmitter 316 and receiver 318 may be integrated in one or more transceivers. Additionally or alternatively, transmitter 316 or receiver 318 may include or correspond to one or more components of UE 115 described with reference to FIG. 2.

Base station 105 may include a variety of components (such as structural, hardware components) used for carrying out one or more functions described herein. For example, these components may include one or more processors 352 (hereinafter referred to collectively as "processor 352"), one or more memory devices 354 (hereinafter referred to collectively as "memory 354"), one or more transmitters 356 (hereinafter referred to collectively as "transmitter 356"), and one or more receivers 358 (hereinafter referred to collectively as "receiver 358").

Processor 352 may be configured to execute instructions stored in memory 354 to perform the operations described herein. In some implementations, processor 352 includes or corresponds to one or more of receive processor 238, transmit processor 220, and controller 240, and memory 354 includes or corresponds to memory 242.

Memory 354 includes or is configured to store DL-UL association manager 360. DL-UL association manager 360 may be configured to perform operations to configure at least one DL anchor carrier to be used for transmitting system information 370 to UE 115, to configure a UL anchor carrier or a plurality of candidate UL anchor carriers that UE 115 may use for initial access and to indicate UL anchor carrier or a plurality of candidate UL anchor carriers to UE 115, and/or to configure a mapping between one or more ROs and the UL anchor carrier or between each of the plurality of candidate UL anchor carriers and corresponding one or more ROs to be used for initial access from UE 115 to base station 105.

Transmitter 356 is configured to transmit reference signals, synchronization signals, control information and data to one or more other devices, and receiver 358 is configured to receive reference signals, control information and data from one or more other devices. For example, transmitter 356 may transmit signaling, control information and data to, and receiver 358 may receive signaling, control information and data from UE 115. In some implementations, transmitter 356 and receiver 358 may be integrated in one or more transceivers. Additionally or alternatively, transmitter 356 or receiver 358 may include or correspond to one or more components of base station 105 described with reference to FIG. 2.

In some implementations, wireless communications system 300 implements a 5G NR network. For example, wireless communications system 300 may include multiple 5G-capable UEs 115 and multiple 5G-capable base stations 105, such as UEs and base stations configured to operate in accordance with a 5G NR network protocol such as that defined by the 3GPP.

During operation of wireless communications system 300, base station 105 may configure system information 370 to configure UE 115 for initial access to base station 105. In aspects, base station 105 and UE 115 in system 100 may be operating in multicarrier communication. In particular, system 100 may implement a flexible multiple carrier communication scheme as described above. In aspects, at least one DL carrier of the multicarrier configuration may be fixed as at least one DL anchor carrier. Base station 105 may transmit system information 370 to UE 115 over the at least one DL anchor carrier. In some aspects, the system information 370 may be associated with a plurality of UL carriers that UE 115 may use for initial access and data transmission. The plurality of UL carriers may represent UL components of carriers aggregated in accordance with the flexible multiple carrier scheme.

During operation of wireless communications system 300, base station 105 transmits system information 370 to UE 115 over the at least one DL anchor carrier. In aspects, system information 370 may include configuration information to enable UE to access base station 105 (e.g., initial access). System information 370 may include an SSB, a CORESET, a SIB (e.g., SIB1, SIB2, . . . , SIB9, etc.), and/or OSI that UE 115 may use to access base station 105. In some aspects, system information 370 transmitted over the at least one DL anchor carrier may carry SSB as well as CORESET (e.g., CORESET #0), SIB (e.g., SIB1), and/or OSI. In this manner, for DL transmissions in a multicarrier configuration implementing a flexible multiple carrier scheme, the DL anchor carrier may be fixed (e.g., fixed to the at least one DL anchor carrier) and used to carry important system information for initial access, which may include SSB as well as CORESET (e.g., CORESET #0), SIB (e.g., SIB1), and/or OSI.

In some aspects, the at least one DL anchor carrier may include a plurality of DL anchor carriers. For example, in some implementations, more than one DL anchor carriers may be fixed as a DL anchor carrier per cell group. In these cases, system information 370 may be transmitted to UE 115 from base station 105 over the plurality of DL anchor carriers per cell group. In some aspects, where more than one DL anchor carriers may be configured, a first portion of system information 370 (e.g., including the SSB) may be transmitted from base station 105 to UE 115 over a first DL anchor carrier of the more than one DL anchor carriers, and a second portion of system information 370 (e.g., including the CORESET (e.g., CORESET #0), the SIB (e.g., SIB1), and/or the OSI) may be transmitted from base station 105 to UE 115 over a second DL anchor carrier of the more than one DL anchor carriers different than the first DL anchor carrier. In these aspects, the first portion of system information 370 (e.g., including the SSB) may include a master information block (MIB), and base station 105 may include an indication in the MIB indicating (e.g., using a carrier ID value) which DL anchor carrier of the more than one DL anchor carriers carries the second portion of system information 370 that includes the CORESET (e.g., CORESET #0), the SIB (e.g., SIB1), and/or the OSI.

During operation of wireless communications system 300, UE 115 determines, based on the system information for initial access, a mapping of the at least one DL anchor carrier to a UL anchor carrier for initial access to the base station. In aspects, base station 105 may configure system information 370 to enable UE 115 to determine the UL anchor carrier (or in some aspects, more than one UL anchor carrier) over which to perform initial access operations (e.g., RACH procedure). In particular aspects, configuring UE 115 to determine the UL anchor carrier over which to perform initial access operations may include configuring UE 115 to determine a mapping of the at least one DL anchor carrier to one or more candidate UL anchor carriers that may be used for initial access. For example, in some aspects, base station 105 may configure the UL anchor carrier to be a UL component of the carrier to which the at least one DL anchor carrier, over which system information 370 including the SSB is transmitted to UE 115, belongs. In this manner, the UL anchor carrier may be the UL component paired to the DL component (e.g., in FDD) and/or the UL slots (e.g., in TDD) of the same carrier.

In some aspects, base station 105 may configure the UL anchor carrier to be configurable. In these aspects, base station 105 may configure system information 370 to enable UE 115 to determine which UL carrier or UL carriers of the multicarrier configuration implementing a flexible multiple carrier scheme may be selected as UL anchor carriers. In some aspects, base station 105 may configure UE 115 to determine which UL carrier or UL carriers of the multicarrier configuration implementing a flexible multiple carrier scheme may be selected as a UL anchor carrier using the MIB or SIB1 in system information 370. In this manner, system information 370 may indicate which UL carriers may be candidate UL anchor carriers from which UE 115 may select the UL anchor carrier for initial access operations.

In aspects, UE 115 may select a UL anchor carrier from the one or more candidate UL anchor carriers determined based on system information 370. In some aspects, UE 115 may select the UL anchor carrier based on predefined metrics. For example, UE 115 may select the UL anchor carrier for initial access operations based on a reference signal received power (RSRP) measurement. In these cases, if the RSRP measurement of a candidate UL anchor carrier exceeds a predetermined threshold, UE 115 may determine the candidate UL anchor carrier as the UL anchor carrier. In some aspects, any candidate UL anchor carrier whose RSRP measurement exceeds the predetermined threshold may be determined as a UL anchor carrier. In this manner, UE 115 may be configured to map the at least one DL anchor carrier to one or more UL carriers of the multicarrier configuration implementing the flexible multiple carrier scheme.

In aspects, by mapping the at least one DL anchor carrier to one or more candidate UL anchor carriers, UE 115 may also map the system information including the SSB transmitted over the at least one anchor carrier to at least one RO configured for the one or more UL carriers. In particular, the SSB transmitted in the at least one DL anchor carrier may be mapped to one or more ROs configured for the candidate UL anchor carriers, which may allow associating the SSB transmitted over the at least one DL anchor carrier to multiple ROs of multiple UL carriers (e.g., to one or more ROs of the candidate UL anchor carriers). In this manner, the association between the SSB of the at least one DL anchor carrier to the one or more ROs of the candidate UL anchor carriers may be configurable and/or one-to-many (e.g., SSB carried over one DL anchor carrier may be associated to ROs of more than one candidate UL anchor carrier). For example, in some aspects, system information 370 may include configuration for at least one RO (or resources for at least one RO) configured for transmitting the initial access information to base station 105. In aspects, the at least one RO configuration may include information, such as RO resources information, that UE 115 may use in a system information request to be sent to the base station 105 as part of the initial access operations. In aspects, UE 115 may select the UL anchor carrier for initial access operations based on system information 370, and may determine a mapping of the selected UL anchor carrier to one or more ROs for performing the initial access operations using the resources of the one or more ROs over the selected UL anchor carrier. For example, UE 115 may, based on system information 370 received over the at least one DL anchor carrier, determine a plurality of candidate UL anchor carriers, and may determine one or more ROs configured for each of the plurality of candidate UL anchor carriers. UE 115 may select the UL anchor carrier from the plurality of candidate UL anchor carriers, may map the selected UL anchor carrier to the corresponding one or more ROs configured for the UL anchor carrier, and may perform initial access operations using the resources of the one or more ROs over the UL anchor carrier.

In aspects, mapping of the one or more ROs to the candidate UL anchor carriers may be determined using various techniques. For example, in some aspects, system information 370 may include a radio resource control (RRC) configuration command that includes an indication of the UL anchor carrier to be used for initial access, as well as RO configuration of the one or more ROs configured for the indicated UL anchor carrier. In some aspects, the RRC configuration command may indicate a plurality of candidate UL anchor carrier from which UE 115 may select the UL anchor carrier (e.g., based on measurement metrics, as described above). In some aspects, the RRC configuration command may include an explicit indication of the carrier ID of the UL anchor carrier (or carrier IDs of the one or more candidate UL anchor carriers) that UE 115 is to use (or from which UE 115 may select to use) for initial access. In some aspects, the explicit indication may include the RO configuration associated with the indicated UL anchor carrier (or the indicated one or more candidate UL anchor carriers). In this manner, the UL anchor carrier to be used (or the one or more candidate UL anchor carriers from which UE 115 may select to use) for initial access may be mapped to corresponding ROs during which UE 115 may perform initial access operations.

In some aspects, mapping of the one or more ROs to the candidate UL anchor carriers may be performed using an implicit indication. For example, system information 370 may include a sequence of sets of ROs configured for the one or more candidate UL anchor carriers. UE 115 may be configured to determine a mapping between a candidate UL anchor carrier and a set of ROs by determining the location of the set of ROs in the sequence. For example, a sequence may include the following: [Carrier 1; Carrier 2; . . . Carrier N]=[RO1, RO2, RO3, RO4, . . . n1; RO5, RO6, RO7, RO8, . . . n2; ROk–3, ROk–2, ROk–1, ROk . . . nN], wherein nN denotes the number of ROs in a set configured for carrier N, and k denotes the number of the highest RO index in the set configured for the carrier. In this case, UE 115 may be configured to determine that candidate UL anchor carrier 2 may be implicitly mapped to RO5, RO6, RO7, R08, . . . n2, as carrier 2 is second in the sequence. Similarly, UE 115 may be configured to determine that candidate UL anchor carrier N may be implicitly mapped to ROk–3, ROk–2, ROk–1, ROk . . . nN, as carrier N is Nth in the sequence. In this manner, a candidate UL anchor carrier may be implicitly mapped to corresponding one or more ROs to be used for initial access over the candidate UL anchor carrier, if the candidate UL anchor carrier is selected as the UL anchor carrier for initial access operations.

In aspects, the initial operations may include PDCCH-enabled RACH operations. In these cases, base station 105 may configure the one or more ROs, and the configuration for the one or more ROs may be transmitted to UE 115 in system information 370, such as via RRC configuration. Base station 105 may indicate to UE 115 to which UL carrier (e.g., to which candidate UL anchor carrier) the one or more ROs belong. In aspects, a field in a downlink control information (DCI) message carried in the PDCCH message to UE 115 may include a carrier ID or carrier IDs of the UL anchor carrier or of the one or more candidate UL anchor carriers to which the one or more ROs belong. In this manner, UE 115 may determine a mapping between the candidate UL anchor carriers and corresponding one or more ROs that may be used for initial access.

During operation of wireless communications system 300, UE 115 performs initial access operations over the UL anchor carrier using the resources of the one or more ROs mapped to the UL anchor carriers. For example, in aspects, UE 115 may perform a RACH access procedure over the UL anchor carrier. In aspects, UE 115 may transmit initial access message, which may include RACH transmissions, during one or more of the ROs configured for the UL anchor carriers, determined based on system information 370.

In aspects, UE 115 may be configured to apply a power offset to the initial access transmissions transmitted to base station 105. For example, in some cases, such as during initial access when the DL carriers and the UL carrier over which the initial access transmission may be made may not be paired, a UE may not possess enough information to accurately perform power estimation for UL transmissions using measurements on the DL transmissions. As such, UE 115 may find difficulty estimating the initial power for initial access transmissions. In aspects of the present disclosure, base station 105 may configure the at least one DL anchor carrier to carry (e.g., in the system information 370) con-figuration including UL carrier specific power offsets for the one or more candidate UL anchor carriers. As such, UE 115 may estimate a power for the initial access transmission based on the corresponding UL carrier specific power offset for the selected UL anchor carrier, following its open loop policy. In aspects, the UL carrier specific power offset may be determined by base station 105 based on experience values or other values known to the base station. For example, based on the experience or prior knowledge in configuring UL carriers, base station 105 may determine a power offset for each UL carrier and may indicate the power offset in system information 370.

Figure 6:
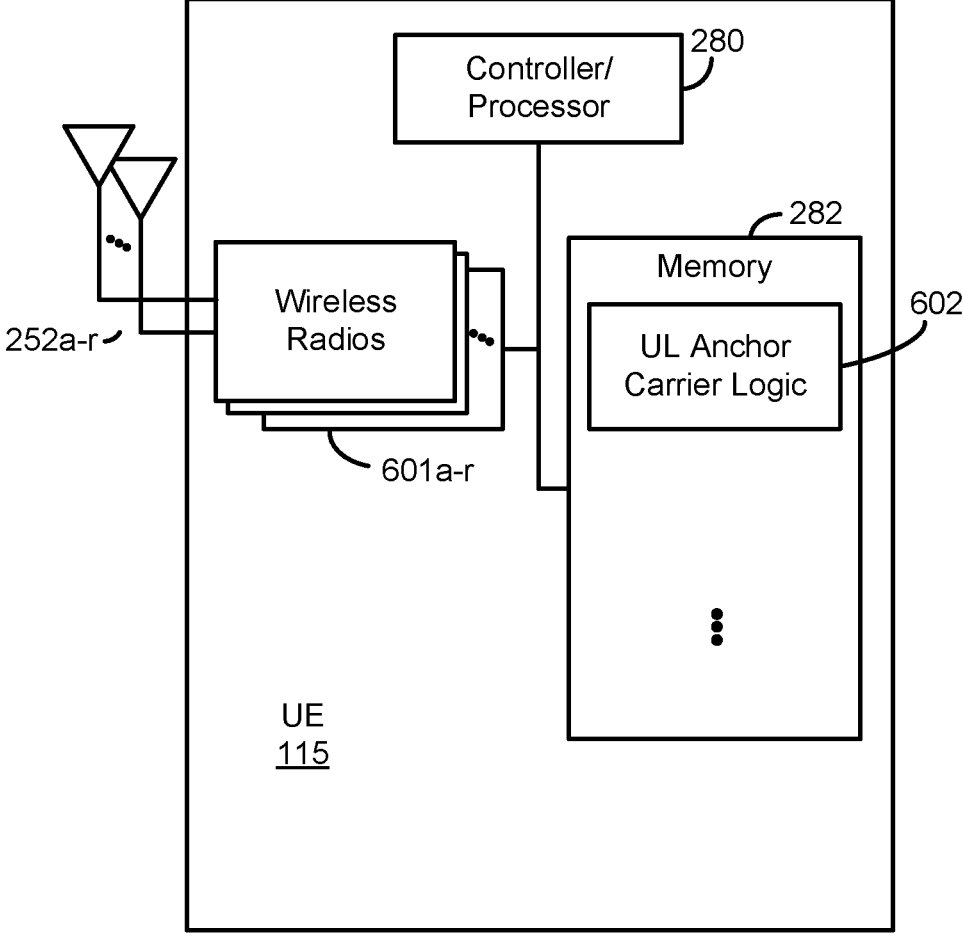
FIG. 6 is a block diagram of an example UE that supports configuring associations between initial access system information of at least one DL anchor carrier and at least one RO of an UL anchor carrier for initial access in flexible multicarrier operations according to one or more aspects.

FIG. 4 is a flow diagram illustrating an example process 400 that supports configuring associations between initial access system information of at least one DL anchor carrier and at least one RO of an UL anchor carrier for initial access in flexible multicarrier operations according to one or more aspects of the present disclosure. Operations of process 400 may be performed by a UE, such as UE 115 described above with reference to FIGS. 1-3, or UE 115 described with reference to FIG. 6. For example, example operations (also referred to as "blocks") of process 400 may enable UE 115 to support configuring associations between initial access system information of at least one DL anchor carrier and at least one RO of an UL anchor carrier for initial access in flexible multicarrier operations. FIG. 6 is a block diagram illustrating UE 115 configured according to aspects of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 601$a$-$r$ and antennas 252$a$-$r$. Wireless radios 601$a$-$r$ include various components and hardware, as illustrated in FIG. 2 for UE 115, including modulator/demodulators 254$a$-$r$, MIMO detector 256, receive processor 258, transmit processor 264, and TX MIMO processor 266.

At block 402 of process 400, a UE (e.g., UE 115) receives, from a base station configured for multicarrier communica-tion (e.g., base station 105), system information for initial access to the base station. For example, base station 105 may broadcast system information for initial access, and UE 115 may receive the system information for initial access via antennas 252$a$-$r$ and wireless radios 601$a$-$r$. In aspects, the system information may be received by the UE over at least one DL anchor carrier configured as a DL anchor carrier by the base station. The at least one DL anchor carrier may be at least one DL component of a carrier of the multicarrier configuration. In aspects, the multicarrier configuration may implement a flexible multiple carrier scheme.

In aspects, the system information for initial access received by the UE may include an SSB, a CORESET, a SIB (e.g., SIB1, SIB2, . . . , SIB9, etc.), and/or OSI including information that the UE may use to access or setup com-munications with the base station. In some aspects, the at least one DL anchor carrier may include a plurality of DL anchor carriers. In these aspects, a first portion of the system information (e.g., a first portion including the SSB) may be received by the UE over a first DL anchor carrier of the plurality of DL anchor carriers, and a second portion of the system information (e.g., a second portion including the CORESET (e.g., CORESET #0), the SIB (e.g., SIB1), and/or the OSI) may be received by the UE over a second DL anchor carrier of the plurality of DL anchor carriers, where the second DL anchor carrier may be different than the first DL anchor carrier. In some aspects, the first portion of the system information may include a MIB, and the MIB may include an indication (e.g., including a carrier ID or carrier IDs) of which DL anchor carrier of the plurality of DL anchor carriers the second portion of the system infor-mation that includes the CORESET (e.g., CORESET #0), the SIB (e.g., SIB1), and/or the OSI was transmitted over from the base station.

In aspects, the at least one DL anchor carrier may include one or more DL anchor carriers for each of a plurality of cell groups. In these aspects, system information for initial access may be received for each cell group (or for a subset of the cell groups) over the respective one or more DL anchor carriers.

At block 402 of process 400, the UE determines, based on the system information for initial access received from base station 105, a mapping of the at least one DL anchor carrier to a UL anchor carrier for initial access to the base station. In order to implement the functionality for such operations, UE 115, under control of controller/processor 280, executes UL anchor carrier logic 602, stored in memory 282. The functionality implemented through the execution environment of UL anchor carrier logic 602 allows for UE 115 to perform UL anchor carrier determination operations according to the various aspects herein.

In some aspects, the UL anchor carrier for transmitting the initial access information to the base station during at least one RO may be a UL component of the carrier that includes the at least one DL anchor carrier. For example, the UE may map the at least one DL component to the UL anchor carrier by mapping the at least one DL component to the UL component of the carrier to which the at least one DL anchor carrier belongs. In this manner, the UL anchor carrier may be the UL component paired to the DL component (e.g., in FDD) and/or the UL slots (e.g., in TDD) of the same carrier as the at least one DL anchor carrier.

In some aspects, the UL anchor carrier for transmitting the initial access information to the base station during at least one RO may be determined based on the system information for initial access received from the base station over the at least one DL anchor. For example, in aspects, the UL anchor carrier may be configurable. For example, in aspects, the UE may determine the UL anchor based on an indication in the MIB or SIB1 in the system information received from the base station. In some aspects, the UE may map the at least one DL component to one or more candidate UL anchor carriers, and the UE may then select the UL anchor carrier from the one or more candidate UL anchor carriers. For example, the UE may measure predefined metrics (e.g., RSRP, etc.), and may select a UL anchor carrier from candidate UL anchor carriers whose metric measurements exceed a predetermined threshold. In this manner, the UE may be configured to map the at least one DL anchor carrier to one or more UL carriers of the multicarrier configuration implementing the flexible multiple carrier scheme.

In aspects, the system information for initial access received over the at least one DL anchor carrier may include configuration for one or more ROs configured for initial access to the base station. In aspects, UE 115 may determine a mapping between the UL anchor carrier (or the one or more candidate UL anchor carriers) and at least one RO of the one or more ROs. For example, in some aspects, the system information for initial access may include an RRC command that the UE may use to determine the mapping between the UL anchor carrier and the at least one RO. In some aspects, the RRC command may include an explicit indication that includes a carrier ID of the UL anchor carrier for transmitting the initial access information to the base station during the at least one RO and the configuration for the at least one RO of the UL anchor carrier for transmitting the initial access information to the base station. In some aspects, the RRC command may include an implicit indication that includes a mapping of the at least one RO and the carrier ID of the UL anchor carrier.

In aspects, receiving the system information for initial access may include receiving a DCI message in a PDCCH transmission from the base station. In aspects, the PDCCH transmission may include a carrier ID of the UL anchor carrier for transmitting the initial access information to the base station during the at least one RO corresponding to the UL anchor carrier.

At block 402 of process 400, UE 115 transmits initial access information to the base station over the UL anchor carrier. For example, UE 115 may transmit initial access information to base station 105 via antennas 252*a-r* and wireless radios 601*a-r*. In aspects, the initial access information may be related to initial access operations performed over the UL anchor carrier using the resources of the one or more ROs mapped to the UL anchor carrier. For example, in aspects, the UE may perform a RACH access procedure over the UL anchor carrier.

In aspects, the system information for initial access received over the at least one DL anchor carrier includes configuration for a power offset to be applied to the UL anchor carrier for transmitting the initial access information to the base station. For example, the at least one DL anchor carrier may be configured to carry (e.g., in the system information) configuration including UL carrier specific power offsets for the one or more candidate UL anchor carriers. The UE may estimate a power for the initial access transmission based on the corresponding UL carrier specific power offset for the selected UL anchor carrier, following its open loop policy. In aspects, the UL carrier specific power offset may be determined by the base station based on experience values or other values known to the base station.

Figure 7:
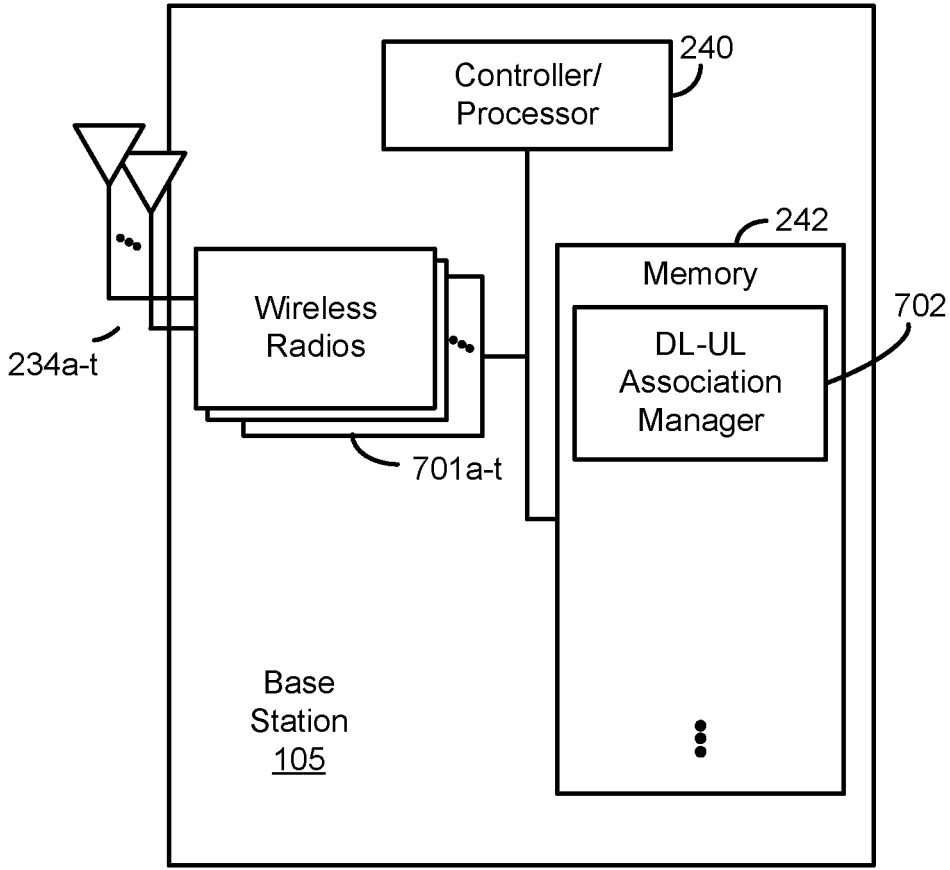
FIG. 7 is a block diagram of an example base station that supports configuring associations between initial access system information of at least one DL anchor carrier and at least one RO of an UL anchor carrier for initial access in flexible multicarrier operations according to one or more aspects.

FIG. 5 is a block diagram illustrating an example an example process 500 that supports configuring associations between initial access system information of at least one DL anchor carrier and at least one RO of an UL anchor carrier for initial access in flexible multicarrier operations according to one or more aspects of the present disclosure. Operations of process 500 may be performed by a base station, such as base station 105 described above with reference to FIGS. 1-3, or base station 105 described with reference to FIG. 7. FIG. 7 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 701*a-t* and antennas 234*a-t*. Wireless radios 701*a-t* include various components and hardware, as illustrated in FIG. 2 for base station 105, including modulator/demodulators 232*a-t*, MIMO detector 236, receive processor 238, transmit processor 220, and TX MIMO processor 230.

At block 502, a base station (e.g., base station 105) configures at least one resource of a UL anchor carrier for receiving initial access information from a UE (e.g., UE 115). In order to implement the functionality for such operations, base station 105, under control of controller/processor 240, executes DL-UL association manager 702, stored in memory 242. The functionality implemented through the execution environment of DL-UL association manager 702 allows for base station 105 to perform UL anchor carrier configuration operations according to the various aspects herein.

In aspects, configuring the at least one resource of the UL anchor carrier may include associating the at least one resource of the UL anchor carrier to at least one DL anchor carrier. For example, in aspects, the base station may be configured for multicarrier operations implementing a flexible multiple carriers scheme. The base station may fix at least one DL carrier of the multicarrier configuration as the at least one DL anchor carrier. In aspects, the base station may associate the UL anchor carrier to the at least one DL anchor carrier, and in that case may associate the at least one resource of the UL anchor carrier to the at least one DL anchor carrier. In aspects, the at least one resource of the UL anchor carrier may be at least one RO configured for the UL anchor carrier for performing initial access operations.

In aspects, the UL anchor carrier to be used for initial access operations may be an uplink component of the carrier that includes the at least one downlink anchor carrier. For example, the base station may configured the at least one DL component to be associated with the UL anchor carrier by mapping the at least one DL component to the UL component of the carrier to which the at least one DL anchor carrier belongs. In this manner, the UL anchor carrier may be the UL component paired to the DL component (e.g., in FDD) and/or the UL slots (e.g., in TDD) of the same carrier as the at least one DL anchor carrier.

In some aspects, the UL anchor carrier to be used for initial access operations may be indicated based on the system information for enabling initial access from the UE to the base station. For example, in aspects, the base station may include an indication in the MIB or SIB1 in the system information indicating the UL anchor carrier (or in some aspects indicating one or more candidate UL anchor carriers from which the UE may select the UL anchor carrier). In this manner, the UE may be configured to map the at least one DL anchor carrier to one or more UL carriers of the multicarrier configuration implementing the flexible multiple carrier scheme.

At block 504, a base station (e.g., base station 105) transmits, to the UE, over the at least one DL anchor carrier, system information for enabling initial access from the UE to the base station over the at least one resource of the UL anchor carrier.

In aspects, the system information for initial access transmitted to the UE may include one an SSB, a CORESET, a SIB (e.g., SIB1, SIB2, . . . , SIB9, etc.), and/or OSI including information that the UE may use to access or setup communications with the base station. In some aspects, the base station may configure the at least one DL anchor carrier to include a plurality of DL anchor carriers. In these aspects, a first portion of the system information (e.g., a first portion including the SSB) may be transmitted over a first DL anchor carrier of the plurality of DL anchor carriers, and a second portion of the system information (e.g., a second portion including the CORESET (e.g., CORESET #0), the SIB (e.g., SIB1), and/or the OSI) may be transmitted over a second DL anchor carrier of the plurality of DL anchor carriers, where the second DL anchor carrier may be different than the first DL anchor carrier. In some aspects, the first portion of the system information may include a MIB, and the MIB may include an indication (e.g., including a carrier ID or carrier IDs) of which DL anchor carrier of the plurality of DL anchor carriers the second portion of the system information that includes the CORESET (e.g., CORESET #0), the SIB (e.g., SIB1), and/or the OSI was transmitted over from the base station.

In aspects, the at least one DL anchor carrier may include one or more DL anchor carriers for each of a plurality of cell groups. In these aspects, system information for initial access may be transmitted from the base station for each cell group (or for a subset of the cell groups) over the respective one or more DL anchor carriers.

In aspects, the system information for initial access transmitted over the at least one resource of the at least one DL anchor carrier may include configuration for one or more ROs configured for initial access to the base station. In aspects, the base station may configure a mapping between the UL anchor carrier and at least one RO of the one or more ROs for the UL anchor carrier for transmitting the initial access information to the base station. For example, in some aspects, the base station may include, in the system information for initial access, an RRC command that the UE may use to determine the mapping between the UL anchor carrier and the at least one RO. In some aspects, the RRC command may include an explicit indication that includes a carrier ID of the UL anchor carrier for transmitting the initial access information to the base station during the at least one RO and the configuration for the at least one RO of the UL anchor carrier for transmitting the initial access information to the base station. In some aspects, the RRC command may include an implicit indication that includes a mapping of the at least one RO and the carrier ID of the UL anchor carrier.

In aspects, transmitting the system information for enabling initial access from the UE to the base station over the at least one resource of the UL anchor carrier may include transmitting a DCI message in a PDCCH transmission to the UE that includes an indication of a carrier ID of the UL anchor carrier for transmitting the initial access information from the UE to the base station during the at least one RO of the UL anchor carrier.

At block 506, the base station (e.g., base station 105) receives, from the UE, initial access information over one or more of the at least one resource of the UL anchor carrier. For example, base station 105 may receive initial access information from UE 115 via antennas 234a-t and wireless radios 701a-t. In aspects, the initial access information may be related to initial access operations performed over the UL anchor carrier using one or more ROs mapped to the UL anchor carrier. For example, in aspects, the base station may receive RACH access transmissions over the UL anchor carrier.

In aspects, the system information for initial access transmitted over the at least one DL anchor carrier may include configuration for a power offset to be applied by the UE to the UL anchor carrier for transmitting the initial access information to the base station. For example, the at least one DL anchor carrier may be configured to carry (e.g., in the system information) configuration including UL carrier specific power offsets for the one or more candidate UL anchor carriers. The UE may estimate a power for the initial access transmission based on the corresponding UL carrier specific power offset for the selected UL anchor carrier, following its open loop policy. In aspects, the UL carrier specific power offset may be determined by the base station based on experience values or other values known to the base station.

In one or more aspects, techniques for supporting configuring associations between initial access system information of at least one DL anchor carrier and at least one RO of an UL anchor carrier for initial access in flexible multicarrier operations may include additional aspects, such as any single aspect or any combination of aspects described below or in connection with one or more other processes or devices described elsewhere herein. In one or more aspects, supporting configuring associations between initial access system information of at least one DL anchor carrier and at least one RO of an UL anchor carrier for initial access in flexible multicarrier operations may include an apparatus configured to receive, from a base station configured for multicarrier communication, over at least one downlink anchor carrier, system information for initial access of the UE to the base station. The at least one downlink anchor carrier is at least one downlink component of a carrier. The apparatus is further configured to determine, based on the system information for initial access, a mapping of the at least one downlink anchor carrier to an uplink anchor carrier for initial access to the base station. The apparatus is further configured to transmit initial access information to the base station over the uplink anchor carrier. Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a first aspect, the system information for initial access includes one or more of an SSB, a CORESET, a SIB, or OSI.

In a second aspect, in combination with the first aspect, the at least one downlink anchor carrier includes a plurality of downlink anchor carriers. A first portion of the system information is received from the base station over a first downlink anchor carrier of the plurality of downlink anchor carriers. A second portion of the system information is received from the base station over a second downlink anchor carrier of the plurality of downlink anchor carriers.

In a third aspect, in combination with the second aspect, the first portion of the system information received over the first downlink anchor carrier includes an indication identifying the second downlink anchor carrier over which the second portion of the system information is transmitted from the base station.

In a fourth aspect, alone or in combination with one or more of the first aspect through the third aspect, the system information for initial access received over the at least one downlink anchor carrier includes configuration for at least one RO of the uplink anchor carrier for transmitting the initial access information to the base station.

In a fifth aspect, in combination with the fourth aspect, the uplink anchor carrier for transmitting the initial access information to the base station during the at least one RO is an uplink component of the carrier that includes the at least one downlink anchor carrier.

In a sixth aspect, in combination with one or more of the fourth aspect through the fifth aspect, the uplink anchor carrier for transmitting the initial access information to the base station during the at least one RO is determined based on the system information for initial access received from the base station over the at least one downlink anchor.

In a seventh aspect, in combination with one or more of the fourth aspect through the sixth aspect, receiving the system information for initial access includes receiving an RRC command including one or more of: an explicit indication that includes a carrier ID of the uplink anchor carrier for transmitting the initial access information to the base station during the at least one RO and the configuration for the at least one RO of the uplink anchor carrier for transmitting the initial access information to the base station; or an implicit indication that includes a mapping of the at least one RO and the carrier ID of the uplink anchor carrier.

In an eighth aspect, in combination with one or more of the fourth aspect through the seventh aspect, receiving the system information for initial access includes receiving a downlink control information (DCI) message in a physical downlink control channel (PDCCH) transmission that includes an indication that includes a carrier identification (ID) of the uplink anchor carrier for transmitting the initial access information to the base station during the at least one RO.

In a ninth aspect, alone or in combination with one or more of the first aspect through the eighth aspect, the at least one downlink anchor carrier includes one or more downlink anchor carriers for each of a plurality of cell groups. The system information for initial access is received over the one or more downlink anchor carriers.

In a tenth aspect, alone or in combination with one or more of the first aspect through the ninth aspect, the system information for initial access received over the at least one downlink anchor carrier includes configuration for a power offset to be applied to the uplink anchor carrier for transmitting the initial access information to the base station.

In one or more aspects, techniques for supporting configuring associations between initial access system information of at least one DL anchor carrier and at least one RO of an UL anchor carrier for initial access in flexible multicarrier operations may include additional aspects, such as any single aspect or any combination of aspects described below or in connection with one or more other processes or devices described elsewhere herein. In one or more aspects, supporting configuring associations between initial access system information of at least one DL anchor carrier and at least one RO of an UL anchor carrier for initial access in flexible multicarrier operations may include an apparatus configured to configure at least one resource of an uplink anchor carrier for receiving initial access information from a user equipment (UE) including associating the at least one resource of the uplink anchor carrier to at least one downlink anchor carrier. The apparatus is further configured to transmit, to the UE, over the at least one downlink anchor carrier, system information for enabling initial access from the UE to the base station over the at least one resource of the uplink anchor carrier. The at least one downlink anchor carrier is at least one downlink component of a carrier; and. The apparatus is further configured to receive initial access information to the base station over one or more of the at least one resource of the uplink anchor carrier. Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In an eleventh aspect, the system information for initial access includes one or more of: an SSB, a CORESET, a SIB, or OSI.

In a twelfth aspect, in combination with the eleventh aspect, the at least one downlink anchor carrier includes a plurality of downlink anchor carriers. A first portion of the system information is transmitted to the UE over a first downlink anchor carrier of the plurality of downlink anchor carriers. A second portion of the system information is transmitted to the UE over a second downlink anchor carrier of the plurality of downlink anchor carriers.

In a thirteenth aspect, in combination with the twelfth aspect, the first portion of the system information transmitted over the first downlink anchor carrier includes an indication identifying the second downlink anchor carrier over which the second portion of the system information is transmitted to the UE.

In a fourteenth aspect, alone or in combination with one or more of the eleventh aspect through the thirteenth aspect, transmitting the system information for enabling initial access from the UE to the base station over the at least one resource of the uplink anchor carrier includes transmitting configuration for at least one random access channel (RACH) occasion (RO) of the uplink anchor carrier for the UE to transmit the initial access information to the base station.

In a fifteenth aspect, in combination with the fourteenth aspect, the uplink anchor carrier over which the initial access information is transmitted to the UE over the one or more of the at least one resource of the uplink anchor carrier is an uplink component of the carrier that includes the at least one downlink anchor carrier.

In a sixteenth aspect, in combination with one or more of the fourteenth aspect through the fifteenth aspect, the uplink anchor carrier over which the initial access information is transmitted to the UE over the one or more of the at least one resource of the uplink anchor carrier is indicated based on the system information for enabling initial access from the UE to the base station.

In a seventeenth aspect, in combination with one or more of the fourteenth aspect through the sixteenth aspect, transmitting the system information for enabling initial access from the UE to the base station over the at least one resource of the uplink anchor carrier includes transmitting a radio resource control (RRC) command including one or more of: an explicit indication that includes a carrier identification (ID) of the uplink anchor carrier for transmitting the initial access information from the UE to the base station during the at least one RO and the configuration for the at least one RO of the uplink anchor carrier; or an implicit indication that includes a mapping of the at least one RO to the carrier ID of the uplink anchor carrier.

In an eighteenth aspect, in combination with one or more of the fourteenth aspect through the seventeenth aspect, transmitting the system information for enabling initial access from the UE to the base station over the at least one resource of the uplink anchor carrier includes transmitting a downlink control information (DCI) message in a physical downlink control channel (PDCCH) transmission that includes an indication that includes a carrier identification (ID) of the uplink anchor carrier for transmitting the initial access information from the UE to the base station during the at least one RO.

In a nineteenth aspect, alone or in combination with one or more of the eleventh aspect through the eighteenth aspect, the at least one downlink anchor carrier includes one or more downlink anchor carriers for each of a plurality of cell groups. The system information for initial access is transmitted over the one or more downlink anchor carriers.

In a twentieth aspect, alone or in combination with one or more of the eleventh aspect through the nineteenth aspect, the system information for initial access transmitted over the at least one downlink anchor carrier includes configuration for a power offset to be applied to the uplink anchor carrier for transmitting the initial access information from the UE to the base station.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-7 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium.

Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination.

Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a user equipment (UE), the method comprising:
  receiving, from a base station, over at least one downlink anchor carrier, system information, wherein the at least one downlink anchor carrier is at least one downlink component of a carrier;
  determining, based on the system information, a mapping of the at least one downlink anchor carrier to an uplink anchor carrier, wherein the uplink anchor carrier is an uplink component of the carrier; and
  transmitting initial access information to the base station over the uplink anchor carrier.

2. The method of claim 1, wherein the system information includes one or more of: a synchronization signal block (SSB), a control resource set (CORESET), a system information block (SIB), or other system information (OSI).

3. The method of claim 2, wherein the at least one downlink anchor carrier includes a plurality of downlink anchor carriers, wherein a first portion of the system information is received from the base station over a first downlink anchor carrier of the plurality of downlink anchor carriers, and wherein a second portion of the system information is received from the base station over a second downlink anchor carrier of the plurality of downlink anchor carriers.

4. The method of claim 3, wherein the first portion of the system information includes an indication identifying the second downlink anchor carrier over which the second portion of the system information is transmitted from the base station.

5. The method of claim 1, wherein the system information includes a configuration of at least one random access channel (RACH) occasion (RO) of the uplink anchor carrier associated with transmitting the initial access information to the base station.

6. The method of claim 5, wherein the uplink anchor carrier is determined based on the system information.

7. The method of claim 5, wherein receiving the system information includes receiving a radio resource control (RRC) command including one or more of:
  an explicit indication that includes a carrier identification (ID) of the uplink anchor carrier and the configuration for of the at least one RO of the uplink anchor carrier; or
  an implicit indication that includes a mapping of the at least one RO and the carrier ID of the uplink anchor carrier.

8. The method of claim 5, wherein receiving the system information includes receiving a downlink control information (DCI) message in a physical downlink control channel (PDCCH) transmission that includes an indication that includes a carrier identification (ID) of the uplink anchor carrier.

9. The method of claim 1, wherein the at least one downlink anchor carrier includes one or more downlink anchor carriers associated with each of a plurality of cell groups, and wherein the system information is received via the one or more downlink anchor carriers.

10. The method of claim 1, wherein the system information a configuration of a power offset to be applied to the uplink anchor carrier.

11. A method of wireless communication performed by a base station, the method comprising:
  configuring at least one resource of an uplink anchor carrier from a user equipment (UE) including associating the at least one resource of the uplink anchor carrier to at least one downlink anchor carrier;
  transmitting, to the UE, over the at least one downlink anchor carrier, system information via the at least one resource of the uplink anchor carrier, wherein the at least one downlink anchor carrier is at least one downlink component of a carrier, and wherein the uplink anchor carrier is an uplink component of the carrier; and
  receiving initial access information over one or more of the at least one resource of the uplink anchor carrier.

12. The method of claim 11, wherein the system information includes one or more of: a synchronization signal block (SSB), a control resource set (CORESET), a system information block (SIB), or other system information (OSI).

13. The method of claim 12, wherein the at least one downlink anchor carrier includes a plurality of downlink anchor carriers, wherein a first portion of the system information is transmitted to the UE over a first downlink anchor carrier of the plurality of downlink anchor carriers, and wherein a second portion of the system information is transmitted to the UE over a second downlink anchor carrier of the plurality of downlink anchor carriers.

14. The method of claim 13, wherein the first portion of the system information transmitted over the first downlink anchor carrier includes an indication identifying the second downlink anchor carrier over which the second portion of the system information is transmitted to the UE.

15. The method of claim 11, wherein transmitting the system information includes transmitting a configuration of at least one random access channel (RACH) occasion (RO) of the uplink anchor carrier associated with transmission of the initial access information to the base station.

16. The method of claim 15, wherein the uplink anchor carrier is indicated based on the system information.

17. The method of claim 15, wherein transmitting the system information includes transmitting a radio resource control (RRC) command including one or more of:
  an explicit indication that includes a carrier identification (ID) of the uplink anchor carrier and the configuration of the at least one RO of the uplink anchor carrier; or
  an implicit indication that includes a mapping of the at least one RO to the carrier ID of the uplink anchor carrier.

18. The method of claim 15, wherein transmitting the system information includes transmitting a downlink control information (DCI) message in a physical downlink control channel (PDCCH) transmission that includes an indication that includes a carrier identification (ID) of the uplink anchor carrier.

19. The method of claim 11, wherein the at least one downlink anchor carrier includes one or more downlink anchor carriers associated with each of a plurality of cell groups, and wherein the system information is transmitted over the one or more downlink anchor carriers.

20. The method of claim 11, wherein the system information includes a configuration associated with a power offset to be applied to the uplink anchor carrier.

21. An apparatus for wireless communication, comprising:

at least one transceiver;

at least one memory comprising instructions; and at least one processor configured to execute the instructions to cause the apparatus to:

receive, from a base station via the at least one transceiver and via at least one downlink anchor carrier, system information, wherein the at least one downlink anchor carrier is at least one downlink component of a carrier;

determine, based on the system information, a mapping of the at least one downlink anchor carrier to an uplink anchor carrier, wherein the uplink anchor carrier is an uplink component of the carrier; and transmit, via the at least one transceiver, initial access information to the base station via the uplink anchor carrier.

22. The apparatus of claim 21, wherein the system information includes a configuration of at least one random access channel (RACH) occasion (RO) of the uplink anchor carrier.

23. The apparatus of claim 22, wherein the at least one processor is further configured to execute the instructions to cause the apparatus to receive, via the at least one transceiver, a radio resource control (RRC) command including one or more of:

an explicit indication that includes a carrier identification (ID) of the uplink anchor carrier during the at least one RO and the configuration for of the at least one RO of the uplink anchor carrier; and an implicit indication that includes a mapping of the at least one RO and the carrier ID of the uplink anchor carrier.

24. The apparatus of claim 22, wherein the at least one processor is further configured to execute the instructions to cause the apparatus to receive, via the at least one transceiver, a downlink control information (DCI) message in a physical downlink control channel (PDCCH) transmission that includes an indication that includes a carrier identification (ID) of the uplink anchor carrier.

25. An apparatus for wireless communication, comprising:

at least one transceiver;

at least one memory comprising instructions; and at least one processor configured to execute the instructions to cause the apparatus to:

configure at least one resource of an uplink anchor carrier associated with receiving initial access information from a user equipment (UE) including associating the at least one resource of the uplink anchor carrier to at least one downlink anchor carrier;

transmit, to the UE via the at least one transceiver and via the at least one downlink anchor carrier, system information, wherein the at least one downlink anchor carrier is at least one downlink component of a carrier, and wherein the uplink anchor carrier is an uplink component of the carrier; and receive, from the UE via the at least one transceiver, the initial access information via one or more of the at least one resource of the uplink anchor carrier.

* * * * *